US008643918B2

(12) United States Patent
Sasaki (10) Patent No.: US 8,643,918 B2
(45) Date of Patent: Feb. 4, 2014

(54) IMAGE READING DEVICE AND IMAGE READING METHOD USED THEREIN

(75) Inventor: Atsushi Sasaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 692 days.

(21) Appl. No.: 12/365,384

(22) Filed: Feb. 4, 2009

(65) Prior Publication Data

US 2009/0195842 A1 Aug. 6, 2009

(30) Foreign Application Priority Data

Feb. 4, 2008 (JP) .................................. 2008-023567

(51) Int. Cl.
*H04N 1/04* (2006.01)

(52) U.S. Cl.
USPC ............ 358/482; 358/483; 358/474; 358/486

(58) Field of Classification Search
None
See application file for complete search history.

(56) References Cited

U.S. PATENT DOCUMENTS

| 5,436,737 | A | * | 7/1995 | Nakajima et al. | ............ | 358/494 |
| 6,531,690 | B2 | * | 3/2003 | Kozuka | ...................... | 250/208.1 |
| 6,539,129 | B1 | | 3/2003 | Yushiya | | |
| 6,687,026 | B1 | * | 2/2004 | Steinebach | .................. | 358/483 |
| 7,034,969 | B2 | * | 4/2006 | Watanabe | ..................... | 358/513 |
| 7,164,506 | B2 | | 1/2007 | TeWinkle | | |
| 7,317,562 | B2 | | 1/2008 | Sawada | | |
| 7,408,683 | B2 | | 8/2008 | Sato et al. | | |
| 7,652,805 | B2 | | 1/2010 | Oguri et al. | | |
| 7,728,891 | B2 | * | 6/2010 | Hiyama et al. | ................ | 348/294 |
| 2007/0002408 | A1 | | 1/2007 | Ikeno | | |

FOREIGN PATENT DOCUMENTS

| JP | 07-312558 A | 11/1995 |
| JP | 08-237424 A | 9/1996 |
| JP | 09-037096 A | 2/1997 |
| JP | 2001-094785 A | 4/2001 |
| JP | 2001-111822 A | 4/2001 |
| JP | 2002-077546 A | 3/2002 |
| JP | 2003-298813 A | 10/2003 |
| JP | 2004-032750 A | 1/2004 |
| JP | 2004-056424 A | 2/2004 |
| JP | 2006-101191 A | 4/2006 |
| JP | 2007-013741 A | 1/2007 |
| JP | 2007-013743 A | 1/2007 |

* cited by examiner

*Primary Examiner* — Cheukfan Lee
(74) *Attorney, Agent, or Firm* — Kilpatrick Townsend & Stockton LLP (57) ABSTRACT

An image reading device, which has an image sensor having a plurality of sensor chips therein and being capable of outputting data in parallel through a plurality of output channels, includes an image reading section configured to perform reading of images in either of two outputting modes, one being a parallel outputting mode in which start signals are simultaneously inputted to the plurality of sensor chips so that pieces of data in the plurality of the sensor chips are outputted in parallel through the plurality of output channels, respectively, the other one being an interval outputting mode in which start signals are sequentially inputted to the plurality of sensor chips at intervals of time between any two successive inputs of the start signals, respectively, so that respective pieces of data in the plurality of sensor chips are sequentially outputted through any one of the plurality of output channels, and a mode selection section configured to select either of the two outputting modes in accordance with a set resolution.

7 Claims, 8 Drawing Sheets

IMAGE READING DEVICE AND IMAGE READING METHOD USED THEREIN

The entire disclosure of Japanese Patent Application No. 2008-023567, filed Feb. 4, 2008 is expressly incorporated by reference herein.

BACKGROUND

1. Technical Field

The present invention relates to an image reading device and an image reading method used therein.

2. Field of Invention

For existing contact-image-sensor (CIS) scanners, which include a plurality of sensor chips therein, the speed with which images are read can be increased by providing a plurality of output channels therein and outputting image data from the plurality of sensor chips in parallel through the plurality of output channels (refer to, for example, JP-A-2001-94785).

On the other hand, increasing the number of output channels in this way leads to disadvantages in that the complexity of data processing increases and the quality of read images is degraded due to electric crosstalk generated among the plurality of output channels.

Further, the increase of the speed with which images are read is likely to be more frequently demanded by users in the case of reading images at a low-resolution (which is less than 600 dpi), but is likely to be not so frequently demanded by users in the case of reading images at a high-resolution, and thus, it is not necessary to continue the parallel outputting of image data in the case of reading images at a high-resolution.

However, in the existing CIS scanners which are designed so as to enable the parallel outputting of image data, since the parallel outputting of image data is uniformly performed regardless of the resolution, it is difficult to flexibly adapt to the users' demands.

SUMMARY

Accordingly, it is desirable to provide an image reading device including a plurality of sensor chips therein, which is capable of flexibly adapting to the users' demands by emphasizing either of the increase of the speed with which images are read or the increase of the quality of read images in accordance with a desired resolution.

Therefore, an image reading device according to an aspect of the invention, which includes a plurality of sensor chips therein and is capable of outputting image data through a plurality of output channels, allows changing control of the sensor chips in accordance with the resolution associated with the reading of images.

For example, an image reading device, which has an image sensor having a plurality of sensor chips therein and being capable of outputting data in parallel through a plurality of output channels, includes an image reading section configured to perform reading of images in either of two outputting modes, one being a parallel outputting mode in which start signals are simultaneously inputted to the plurality of sensor chips so that pieces of data in the plurality of sensor chips are outputted in parallel through the plurality of output channels, respectively, the other one being an interval outputting mode in which start signals are sequentially inputted to the plurality of sensor chips at intervals of time between any two successive inputs of the start signals, respectively, so that respective pieces of data in the plurality of sensor chips are sequentially outputted through any one of the plurality of output channels, and a mode selection section configured to select either of the two outputting modes in accordance with a set resolution.

BRIEF DESCRIPTION OF THE DRAWINGS

The invention will be described with reference to the accompanying drawings, wherein like numbers reference like elements.

DESCRIPTION OF EXEMPLARY EMBODIMENTS

An exemplary embodiment of the invention will be hereinafter described.

Figure 1:
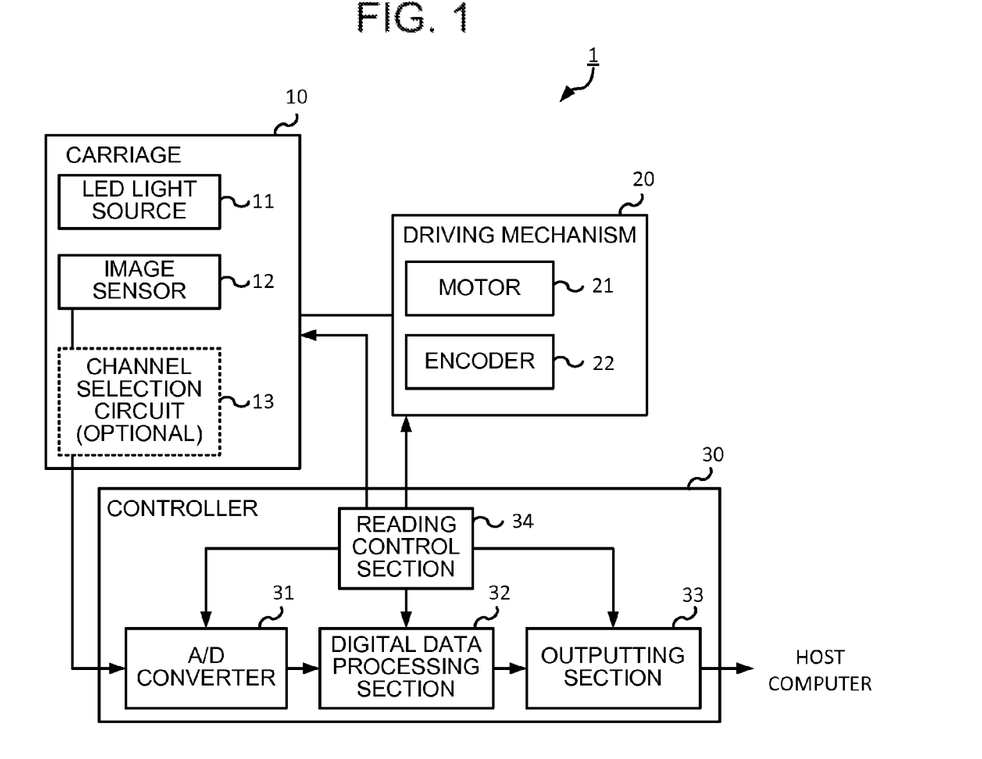
FIG. 1 is a schematic diagram illustrating a configuration of an image reading device according to an embodiment of the invention.

FIG. 1 is a schematic diagram illustrating a configuration of an image reading device according to the embodiment of the invention.

An image reading device 1, shown in FIG. 1, is a so-called flatbed type image reading device provided with a document mounting table on the top of a body thereof. The image reading device 1 performs reading of images of a document fixed on the document mounting table composed of a transparent plate by scanning the document using an image sensor 12 employing the contact image sensor (CIS) method.

The image reading device 1 includes a carriage 10 incorporating therein an LED light source 11, the image sensor 12 and a channel selection circuit 13; a driving mechanism 20 configured to perform control of a back-and-forth movement of the carriage 10; and a controller 30 configured to perform control of the whole of the image reading device 1 and perform various processes of reading images.

The LED light source 11 sequentially generates each of three color light-rays of RGB.

The image sensor 12 receives light-rays reflected by the document, stores electric charges equivalent to the amount of the received light-rays, and sends signals (i.e., pieces of image data) associated with read images, which are obtained from the stored electric charges, to the controller 30.

The carriage 10 carries the image sensor 12 together with the LED light source 11 in a sub-scanning direction. The carriage 10 is slidably latched to a guide shaft or the like mounted in parallel with the surface of the document mounting table, and performs the back-and-forth movement as a result of being pulled by a belt which is rotated by a motor 21 of the driving mechanism 20. The amount of the back-and-forth movement of the carriage 10 is controlled so as to be in accordance with output values from an encoder 22, which outputs pulses in accordance with the amount of rotation of the motor 21.

The controller 30 includes an A/D converter 31 configured to convert analog image data outputted from the image sensor 12 into digital image data; a digital data processing section 32 configured to perform various correction processes associated with the digital image data outputted from the A/D converter 31; an outputting section 33 configured to send the resultant digital image data outputted from the digital data processing section 32 to a host computer, such as a personal computer; and a reading control section 34 configured to perform control of all of the function sections inside the controller 30, as well as the LED light source 11 and the image sensor 12 inside the carriage 10, and the driving mechanism 20.

In addition, the A/D converter 31 may be mounted on a substrate inside the carriage 10.

The reading control section 34 performs control of the driving mechanism 20, the rotation of the motor 21, the back-and-forth movement of the carriage 10, and further, the turning on/off of the LED light source 11.

Moreover, the reading control section 34 performs control of reading operations of the image sensor 12; more specifically, it controls the timings at which the read image data is transferred to the A/D converter 31.

Further, the reading control section 34 performs control so as to cause the channel selection circuit 13 to execute channel selection.

The controller 30 including the above-described function sections can be realized by using a computer composed of components such as a CPU functioning as a main controller, ROM chips for storing programs and so on, RAM chips constituting a main memory for temporarily storing data and so on, an interface section for performing control of outputting/inputting to/from the host computer and so on, and a system bus functioning as a communication path among the above-described individual components. In addition, the controller 30 may be composed of application specific integrated circuits (ASICs), each being designed so as to specifically perform the process of one of the above-described function sections included in the controller 30.

Figure 2:
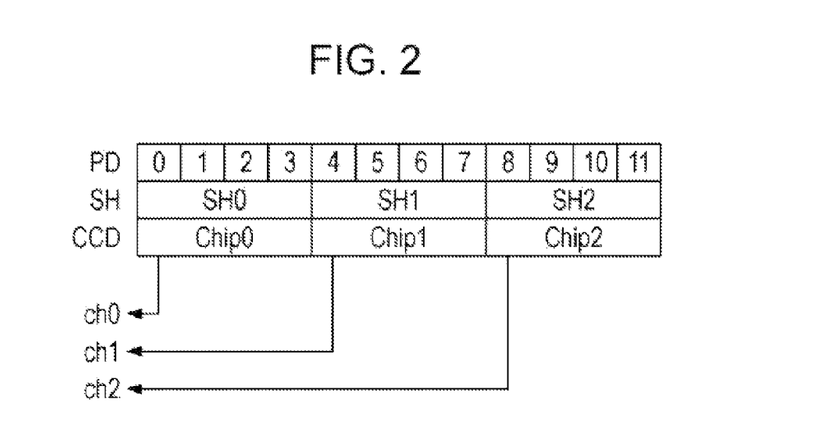
FIG. 2 is a diagram illustrating a configuration of an image sensor according to an embodiment of the invention.

Hereinafter, the image sensor 12 will be described in detail. FIG. 2 is a diagram illustrating a configuration of the image sensor 12.

The image sensor 12 is composed of a plurality of sensor chips (Chips N, N=0, 1, 2 . . . ) arranged in a main-scanning direction. FIG. 2 illustrates an example of the configuration of the image sensor 12, in which the image sensor 12 includes three sensor chips each being composed of four pixels, and three output channels (ch 0, ch 1 and ch 2). Each of the sensor chips has the same elements as a typical charge-coupled-device (CCD) image sensor. That is, each of the sensor chips includes photoelectric conversion elements (photodiodes (PDs)), a shift gate (SH) and a shift register (CCD). Moreover, each of the sensor chips transfers electric charges stored in the photoelectric conversion elements to the shift register by opening the shift gate, and then, causes the shift register to sequentially shift and output the electric charges. The opening of the shift gate is controlled by a shift gate pulse. The shift register shifts and outputs the electric charges in response to a supplied series of driving pulses (i.e., a supplied reading clock). The transferred electric charges are converted to electrical signals (analog data) by an outputting section (not shown in FIGS. 1 and 2) located at the terminal of the shift register and the resultant electrical signals are sent to the A/D converter 31.

Figure 3:
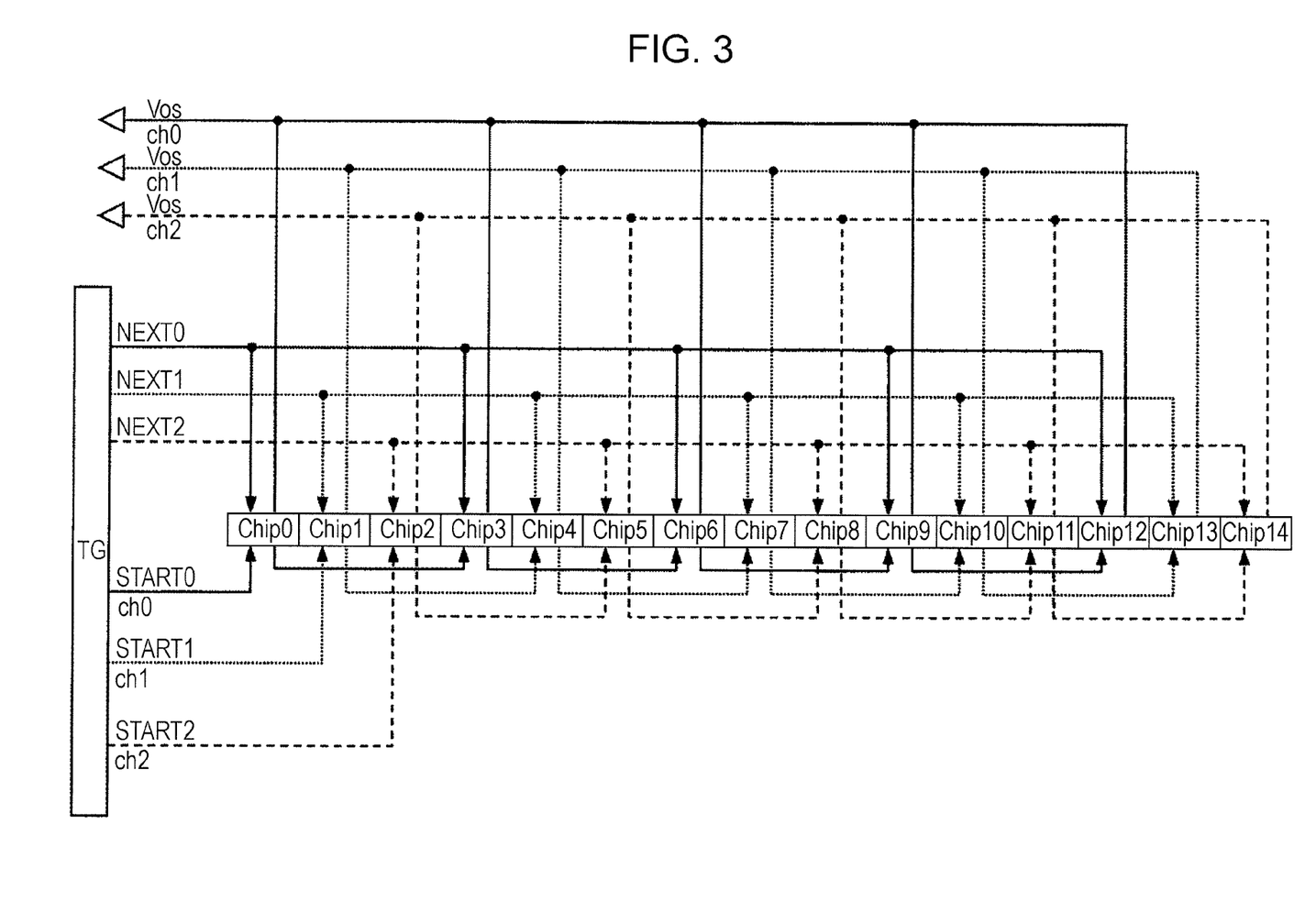
FIG. 3 is a diagram illustrating a configuration of an image sensor according to an embodiment of the invention.

FIG. 3 is a diagram illustrating an example of the arrangement of the sensor chips included in the image sensor 12 having three output channels.

The outputting of image data from each of the sensor chips is controlled by a start signal and a next signal generated by a timing generator TG. In addition, the timing generator TG is controlled by the reading control section 34.

Upon receipt of a start signal from the timing generator TG, each of the sensor chips commences outputting of image data. Further, upon receipt of a next signal at the same time as receipt of the start signal, the sensor chip transfers the received start signal to a subsequent sensor chip (i.e., a subsequent sensor chip being connected to the same output channel and located in the main-scanning direction).

In the example shown in FIG. 3, a next signal NEXT 0 is inputted to sensor chips Chip 0, Chip 3, Chip 6, . . . , and Chip 3n, each constituting a group of sensor chips connected to the same output channel ch 0, which is named a zero-th channel group of sensor chips, and a next signal NEXT 1 is inputted to sensor chips Chip 1, Chip 4, Chip 7, . . . , and Chip 3n+1, each constituting a group of sensor chips connected to the same output channel ch 1, which is named a first channel group of sensor chips, and further, a next signal NEXT 2 is inputted to sensor chips Chip 2, Chip 5, Chip 8, . . . , and Chip 3n+2, each constituting a group of sensor chips connected to the same output channel ch 2, which is named a second channel group of sensor chips; wherein n=0, 1, 2, . . . .

Moreover, a start signal START 0 is firstly inputted to the sensor chip Chip 0, and then, is transferred to the sensor chip Chip 3 by the sensor chip Chip 0 in synchronization with the next signal NEXT 0, and subsequently, the start signal START 0 is transferred to the sensor chip Chip 6 by the sensor chip Chip 3 in synchronization with the next signal NEXT 0. In the following, in the same manner as, or in a manner similar to, that described above, the start signal START 0 is sequentially relayed to subsequent sensor chips included in the zero-th channel group of sensor chips. Further, to the sensor chips Chip 1 and Chip 2, start signals START 1 and START 2 are firstly inputted, and then, are sequentially relayed to subsequent sensor chips included in the first channel group of sensor chips and subsequent sensor chips included in the second channel group of sensor chips, respectively, in the same manner as, or in a manner similar to, that described above.

The image reading device 1 according to an embodiment of the invention includes two outputting modes, as outputting modes of the image sensor 12, one being a parallel outputting mode, the other one being an interval outputting mode.

Figure 4:
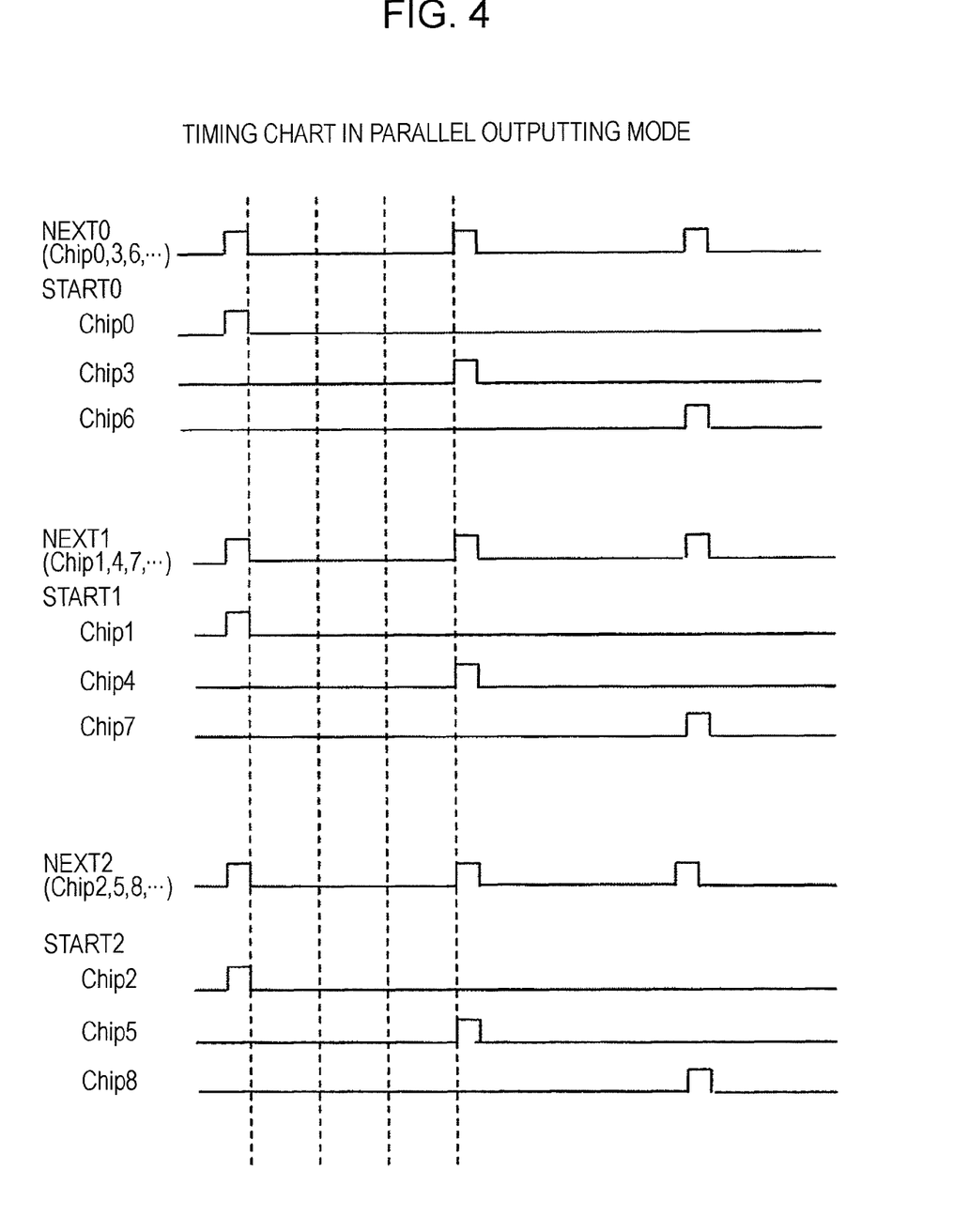
FIG. 4 is a timing chart of a parallel outputting mode according to an embodiment of the invention.

FIG. 4 is a timing chart illustrating the timings of the start signals and the next signals in the case of the parallel outputting mode.

As shown in FIG. 4, the next signals NEXT 0, NEXT 1 and NEXT 2 are simultaneously inputted to sensor chips included in the zero-th channel group of sensor chips, i.e., Chip 0, Chip 3, Chip 6, . . . , and Chip 3n; sensor chips included in the first channel group of sensor chips, i.e., Chip 1, Chip 4, Chip 7, . . . , and Chip 3n+1; and sensor chips included in the second channel group of sensor chips, i.e., Chip 2, Chip 5, Chip 8, . . . , and Chip 3n+2, respectively; wherein n=0, 1, 2, . . . .

Further, the start signals START 0, START 1 and START 2 are simultaneously inputted to first sensor chips Chip 0, Chip 1 and Chip 2 of the three channel groups of sensor chips in synchronization with the first next signals NEXT 0, NEXT 1 and NEXT 2, respectively. In this manner, respective operations of outputting image data from the sensor chips Chip 0, Chip 1 and Chip 2 simultaneously commence, and as a result, the parallel outputting of image data is performed.

Furthermore, the start signals START 0, START 1 and START 2 are relayed by the next signals NEXT 0, NEXT 1 and NEXT 2, and are simultaneously inputted to second sensor chips Chip 3, Chip 4 and Chip 5 of the three channel groups of sensor chips, respectively. In this manner, respective operations of outputting image data from the sensor chips Chip 3, Chip 4 and Chip 5 simultaneously commence, and as a result, the parallel outputting of image data is performed. In the following, the same process as, or a process similar to, that described above is performed with respect to each of the following sensor chips including a final sensor chip.

As described above, the simultaneous operations of inputting of respective start signals to the first sensor chips of the three channel groups of sensor chips enable realization of the parallel outputting mode.

Figure 5:
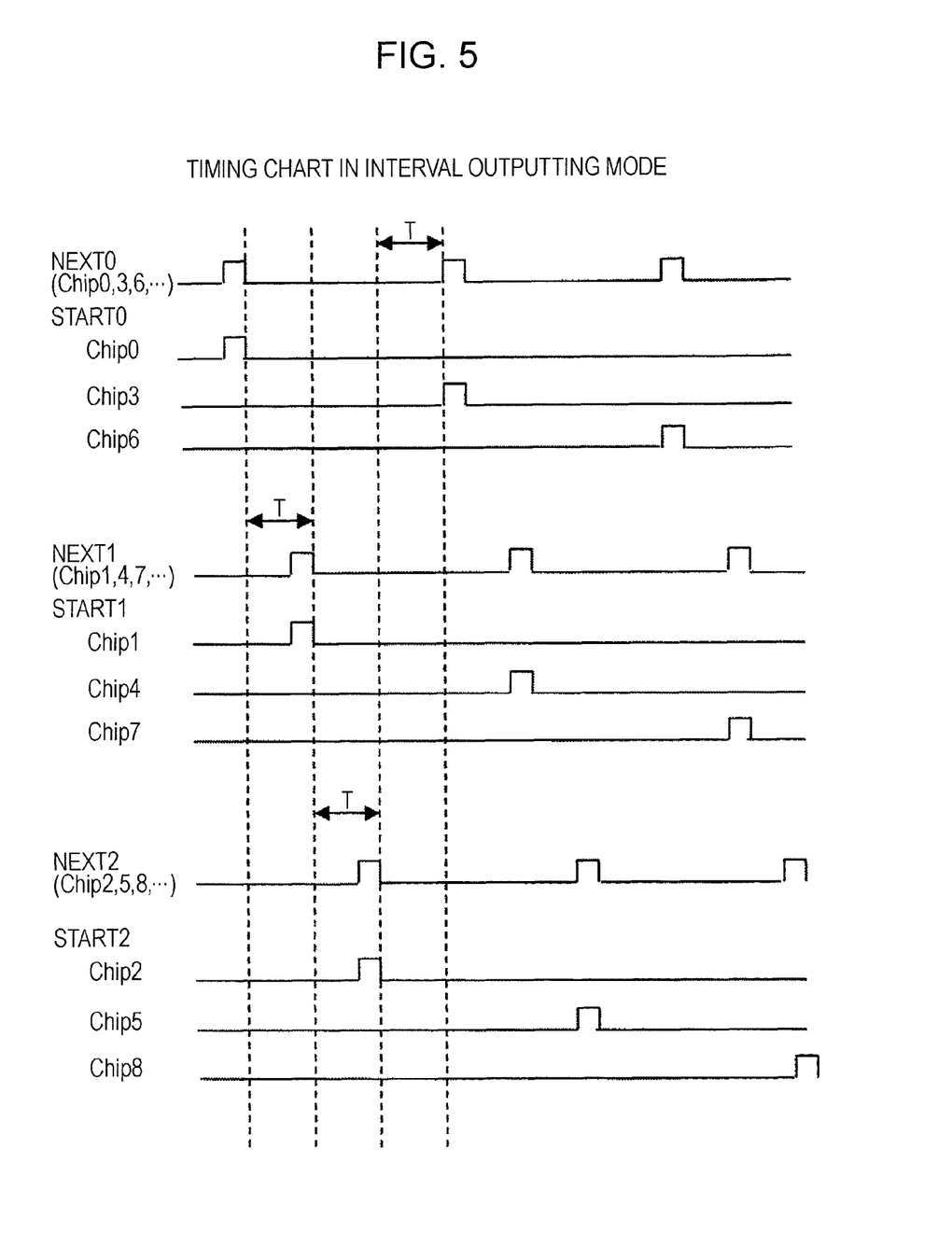
FIG. 5 is a timing chart of an interval outputting mode according to an embodiment of the invention.

FIG. 5 is a timing chart illustrating the timings of the start signals and the next signals in the case of the interval outputting mode.

As shown in FIG. 5, first next signals NEXT 0, NEXT 1 and NEXT 2 are not simultaneously inputted but are sequentially inputted to the sensor chips Chip 0, Chip 1 and Chip 2 at intervals of time T between any two successive inputs of the first next signals, respectively.

Moreover, the start signals START 0, START 1 and START 2 to be supplied to the three channel groups of sensor chips are inputted to the first sensor chips Chip 0, Chip 1 and Chip 2 of the three channel groups of sensor chips in synchronization with the first next signals NEXT 0, NEXT 1 and NEXT 2, respectively. That is, the start signals START 0, START 1 and START 2 are not simultaneously inputted but are sequentially inputted to the first sensor chips Chip 0, Chip 1 and Chip 2 of the three channel groups of sensor chips at the intervals of time T between any two successive inputs of the start signals, respectively.

Additionally, the intervals of time T, at which the next signals NEXT 0, NEXT 1 and NEXT 2 are inputted to the first sensor chips Chip 0, Chip 1 and Chip 2 of the three channel groups of sensor chips, that is, the intervals of time T, at which the start signals START 0, START 1 and START 2 are inputted to the first sensor chips Chip 0, Chip 1 and Chip 2 of the three channel groups of sensor chips, are preferred to be long enough for sensor chips supplied with immediately previous start signals to perfectly complete outputting of image data, respectively. Otherwise, the quality of images are degraded due to the electric crosstalk resulting from occurrence of periods of time during which pieces of image data are transferred in parallel through the plurality of output channels.

The differences between any successive input timings of the start signals START 0, START 1 and START 2 cause the sensor chips Chip 0, Chip 1 and Chip 2 to commence outputting of image data at the intervals of time T, respectively, and thus, enable realization of the interval outputting mode.

The first start signals START 0, START 1 and START 2 are relayed in synchronization with the next signals NEXT 0, NEXT 1 and NEXT 2, and are inputted to the next sensor chips Chip 3, Chip 4 and Chip 5, respectively. In addition, since the input timing of each of the first start signals differs, the outputting of image data from each of the sensor chips Chip 3, Chip 4 and Chip 5 is performed at the interval of time T, and this operation leads to the interval outputting mode. In the following, the same process as, or a process similar to, that described above is performed with respect to each of the following sensor chips including a final sensor chip.

As described above, the inputting of start signals at intervals of time to respective first sensor chips of the three channel group of sensor chips enables realization of the interval outputting mode.

Hereinafter, the channel selection circuit 13 will be described.

FIG. 6 is a diagram illustrating a configuration of the channel selection circuit 13.

The channel selection circuit 13 selects the channels at the image sensor 12 side in accordance with either of the outputting modes, and connects the resultant output channels, or one output channel, to output channels, or any one of output channels, at the A/D converter 31 side (i.e., to AFE channels, or any one of AFE channels).

Figure 6A:
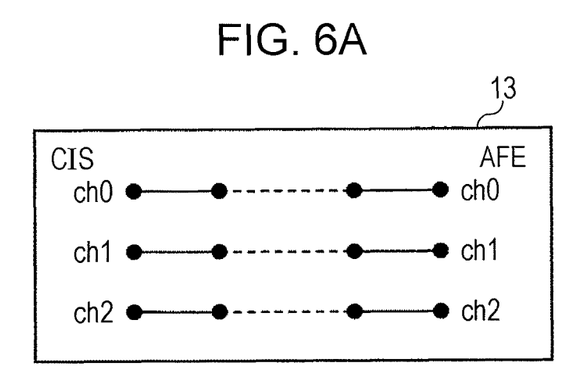
FIG. 6 is a diagram illustrating a configuration of a channel selection circuit according to an embodiment of the invention.
Figure 6B:
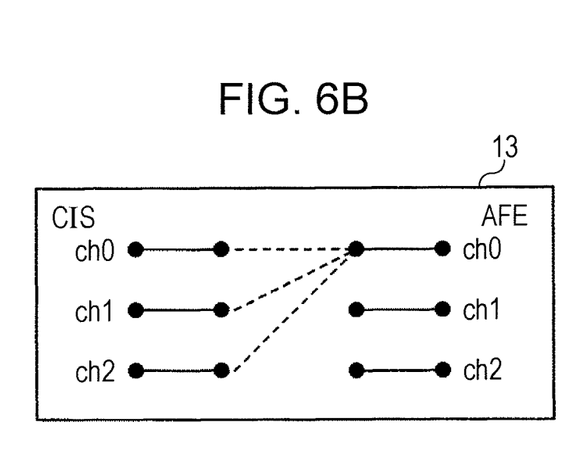

More specifically, in the case of the parallel outputting mode, as shown in FIG. 6A, the channel selection circuit 13 connects the output channels at the image sensor 12 side to the same numbered output channels at the A/D converter 31 side, respectively. In contrast, in the case of the interval outputting mode, as shown in FIG. 6B, the channel selection circuit 13 concentrates the output channels at the image sensor 12 side into one output channel and connects the resultant one output channel to any one of the output channels at the A/D converter side. In this manner, pieces of read data are concentrated into one of the AFE channels.

Hereinafter, a flow of operations for reading images according to an embodiment of the invention will be described.

Figure 7:
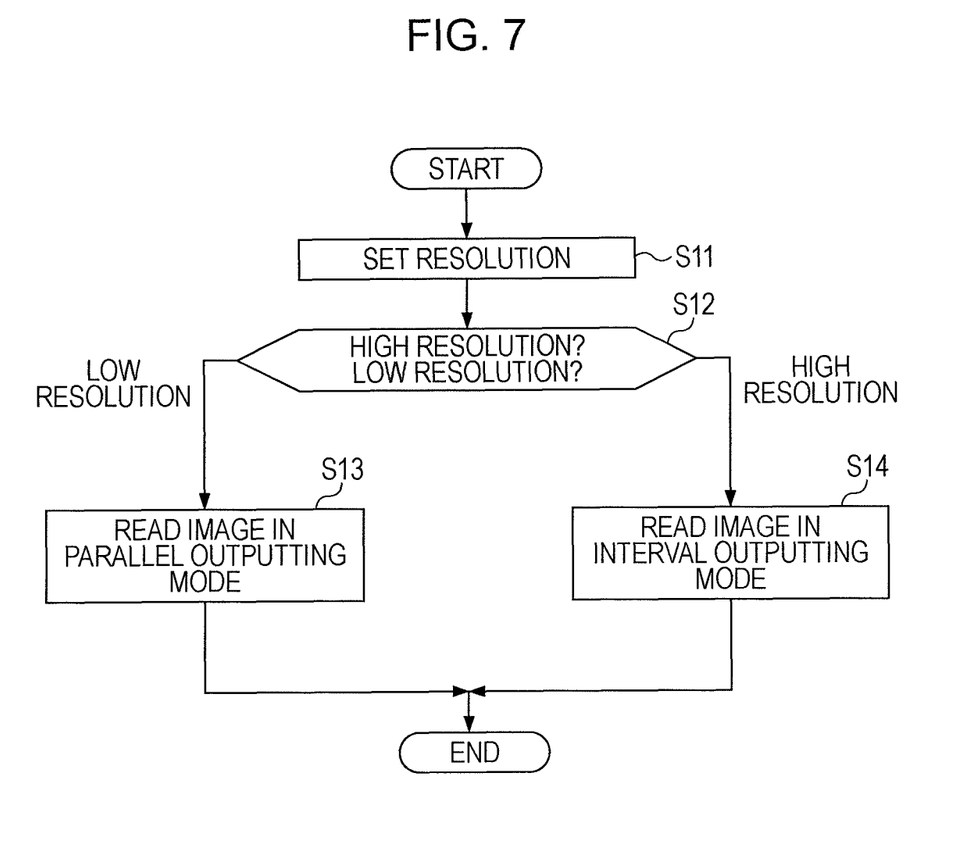
FIG. 7 is a flowchart of an image reading method according to an embodiment of the invention.

FIG. 7 is a flowchart illustrating operations of the image reading device 1.

Firstly, in step S11, the reading control section 34 sets a resolution associated with the reading of images in accordance with a direction from the host computer.

Subsequently, in step S12, the reading control section 34 determines whether the set resolution is a high-resolution or a low-resolution by discriminating whether the value of the set resolution is more than a predetermined threshold value (for example, 600 dpi), or not.

When the determination, in step S12, is the low-resolution, i.e., in the case where the low-resolution is set, the reading control section 34 switches the outputting mode to the parallel outputting mode. At the same time, the reading control section 34 performs control so as to cause the channel selection circuit 13 to operate under the parallel outputting mode (refer to FIG. 6A). Subsequently, the reading control section 34 performs the reading of images in the parallel outputting mode, and further, at the set resolution (for example, 600 dpi).

More specifically, the reading control section 34 performs control so as to cause the timing generator TG of the image sensor 12 to generate the start signals and the next signals shown in FIG. 4. In this manner, the parallel outputting is performed.

Figure 8A:
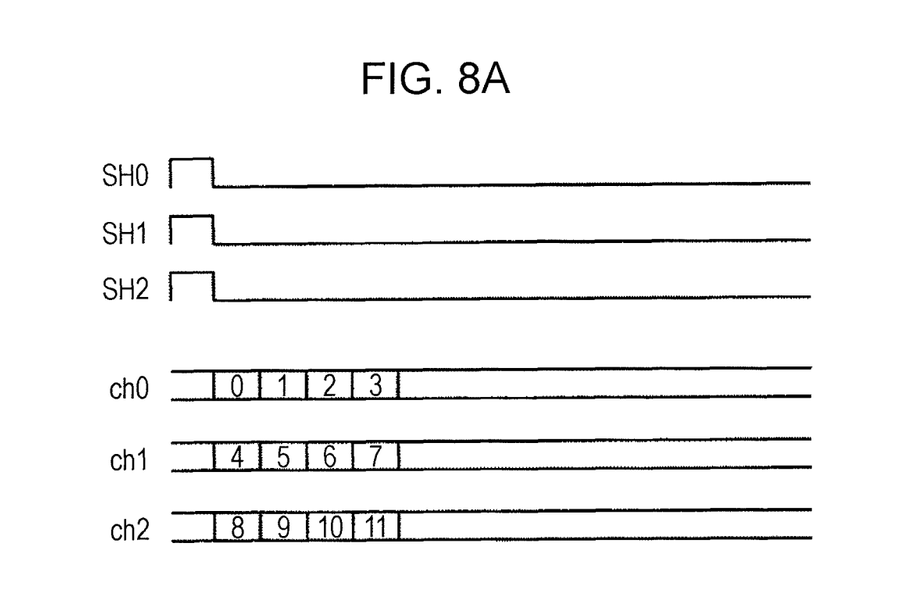
FIG. 8 is a diagram used for describing a parallel outputting mode according to an embodiment of the invention.

FIG. 8A is a diagram illustrating the condition of the parallel outputting in the configuration of the sensor chips shown in FIG. 2. As shown in FIG. 8A, to respective sensor chips Chip 0, Chip 1 and Chip 2 corresponding to the output channels ch 0, ch 1 and ch 2, the gate signals SH 0, SH 1 and SH 2 for opening the shift gates are simultaneously inputted, and then, through respective output channels ch 0, ch 1 and ch 2, pieces of image data in the sensor chips Chip 0, Chip 1 and Chip 2 are simultaneously transferred, and as a result, are outputted in parallel.

Figure 8B:
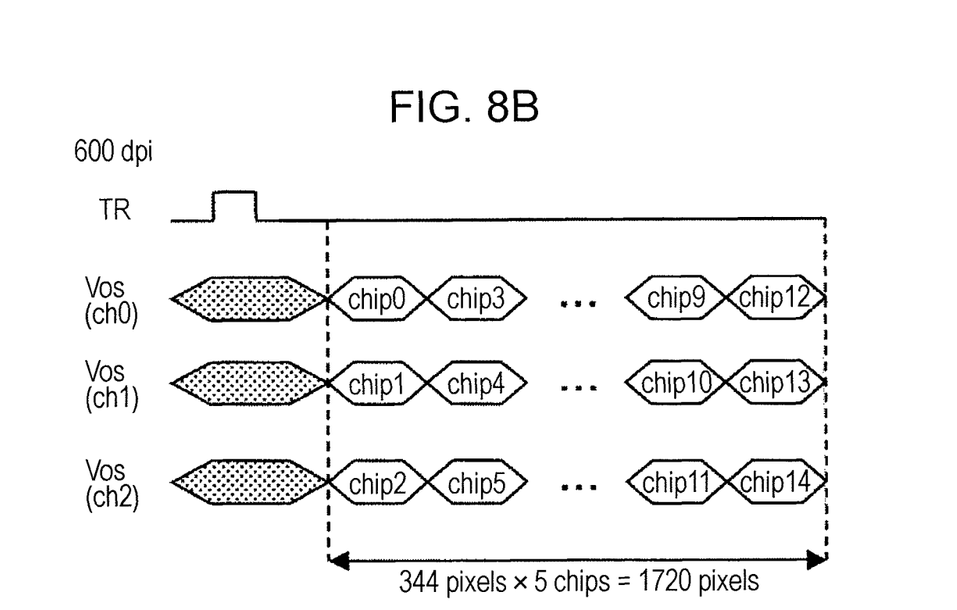

Further, FIG. 8B is a diagram illustrating the condition of the parallel outputting in the configuration of the sensor chips shown in FIG. 3. As shown in FIG. 8B, the pieces of image data in the sensor chips Chip 0, Chip 1 and Chip 2 are simultaneously transferred, and subsequently, the pieces of image data in the sensor chips Chip 3, Chip 4 and Chip 5 are simultaneously transferred, and further, in the following, the same operation as, or an operation similar to, that described above is repeated, so that the parallel outputting is achieved.

On the other hand, when the determination, in step S12, is the high-resolution, i.e., in the case where the high-resolution is set, the reading control section 34 switches the outputting mode to the interval outputting mode. At the same time, the reading control section 34 performs control so as to cause the channel selection circuit 13 to operate under the interval outputting mode (refer to FIG. 6B). Subsequently, the reading control section 34 performs the reading of images in the interval outputting mode, and further, at the set resolution (for example, 1200 dpi).

More specifically, the reading control section 34 performs control so as to cause the timing generator TG of the image sensor 12 to generate the start signals and the next signals shown in FIG. 5. In this manner, the interval outputting is performed.

Figure 9A:
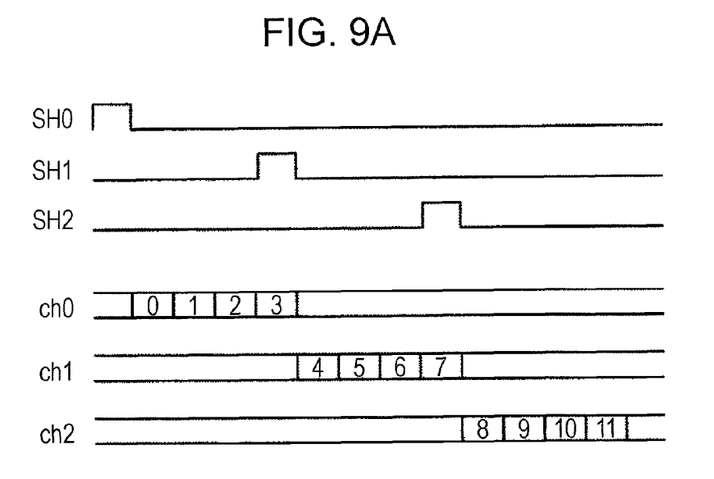
FIG. 9 is a diagram used for describing an interval outputting mode according to an embodiment of the invention.

FIG. 9A is a diagram illustrating the condition of the interval outputting in the configuration of the sensor chips shown in FIG. 2. As shown in FIG. 9A, to respective sensor chips Chip 0, Chip 1 and Chip 2 corresponding to the output channels ch 0, ch 1 and ch 2, the gate signals SH 0, SH 1 and SH 2 for opening the shift gates are inputted at intervals of time, and then, through respective output channels ch 0, ch 1 and ch 2, the pieces of image data in the sensor chips Chip 0, Chip 1 and Chip 2 are transferred at the intervals of time, and thus, are sequentially outputted.

Figure 9B:
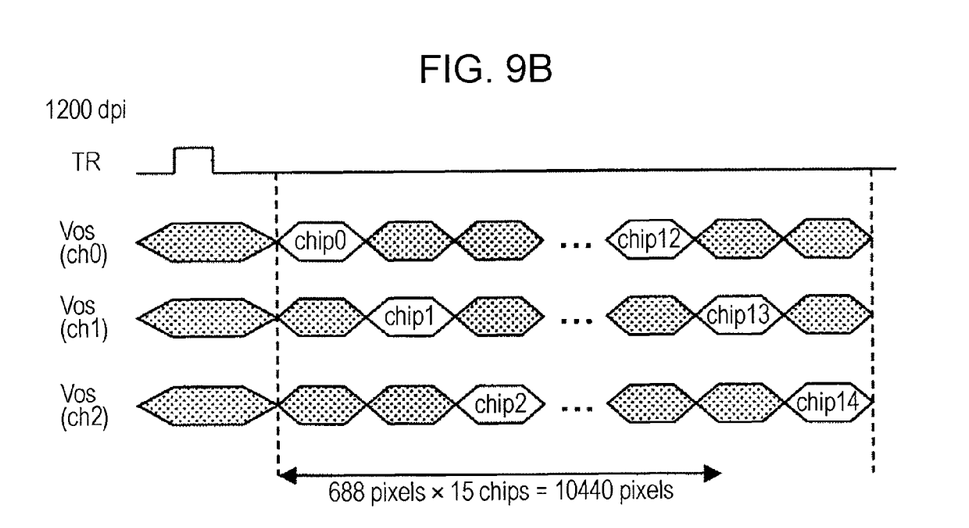

Further, FIG. 9B is a diagram illustrating the condition of the interval outputting in the configuration of the sensor chips shown in FIG. 3. As shown in FIG. 9B, respective pieces of image data in the sensor chips Chip 0, Chip 1 and Chip 2 are sequentially transferred without being overlapped, and subsequently, respective pieces of image data in the sensor chips Chip 3, Chip 4 and Chip 5 are sequentially transferred without being overlapped, and further, in the following, the same operation as, or an operation similar to, that described above is repeated, so that the interval outputting is achieved.

Subsequent to completion of the reading of images, the reading control section 34 terminates the flow shown in FIG. 7.

The exemplary embodiment of the invention has been described above.

According to the above-described embodiment of the invention, the image reading device 1 sets either of the parallel outputting mode or the interval outputting mode in accordance with a resolution directed by the host computer. Moreover, the image reading device 1 performs control so as to allow the image sensor 12 to output pieces of image data in accordance with the set outputting mode. Therefore, in the reading of images at a low-resolution, the parallel outputting mode provides users, who require promptness in the process of the reading of images, with the high-speed reading of images. In contrast, in the reading of images at a high-resolution, the interval outputting mode provides users, who do not require the promptness so much but require high-quality of read images in the process of the reading of images, with the reading of images being capable of preventing the electric crosstalk, and thus, achieving the high-quality of read images.

Additionally, in the above-described embodiment of the invention, the channel selection circuit 13 is provided and configured so as to concentrate the image data from the image sensor 12 into one output channel under the condition where the image data is analog. However, the invention is not limited to this configuration. Another configuration capable of achieving the same effect as, or an effect similar to, that in the above-described embodiment of the invention, in which appropriate image data is selected under the condition where the image data is digital, may be provided.

In this another configuration, the channel selection circuit 13 is unnecessary, and the output channels at the image sensor 12 side are connected to the same numbered output channels at the A/D converter 31 side, respectively, and this condition is the same as that shown in FIG. 6A. The A/D converter 31 converts pieces of analog image data in respective output channels to pieces of digital image data, and then, transfers the pieces of digital image data to the digital data processing section 32 through the output channels. Furthermore, the digital data processing section 32 selects output channels, each including pieces of digital image data appropriate to be read in, from among the plurality of output channels, and then, transfers the pieces of digital image data included in the selected output channels to the outputting section 33. In this manner, the pieces of digital image data appropriate to be read in are transferred to the outputting section 33.

What is claimed is:

1. An image reading device comprising:
an image sensor including a plurality of sensor chips therein and being capable of outputting data in parallel through a plurality of output channels,
an image reading section configured to perform reading of images in either of two outputting modes,
wherein one outputting mode is a parallel outputting mode in which start signals are simultaneously inputted to the plurality of sensor chips so that pieces of data in the plurality of the sensor chips are outputted in parallel through the plurality of output channels, respectively,
the other one outputting mode is an interval outputting mode in which start signals are sequentially inputted to the plurality of sensor chips at intervals of time between any two successive inputs of the start signals, respectively, so that respective pieces of data in the plurality of sensor chips are sequentially outputted through any one of the plurality of output channels; and
a mode selection section configured to set the parallel outputting mode in the case where the reading of images is performed at a low-resolution, and to set the interval outputting mode in the case where the reading of images is performed at a high-resolution,
wherein the plurality of sensor chips are grouped into a plurality of sensor chip groups, and the mode selection section changes the outputting mode of the sensor chips included in each sensor chip group to the parallel outputting mode or the interval outputting mode.

2. The image reading device according to claim 1, wherein, in the interval outputting mode, the interval of time is at least long enough for a sensor chip supplied with an immediately previous start signal to complete outputting of data.

3. The image reading device according to claim 1, further comprising a selection circuit configured to select and output pieces of data appropriate to image data to be read in from among pieces of analog data outputted from the plurality of sensor chips.

4. The image reading device according to claim 1, further comprising a digital data processing section configured to select and output pieces of data appropriate to image data to be read in from among pieces of digital data resulting from an analog-to-digital conversion of pieces of analog data outputted from the plurality of sensor chips.

5. The image reading device of claim 1, wherein in the interval outputting mode for reading of images at the high-resolution, only one piece of image data corresponding to one sensor chip is outputted at a time from the image sensor.

6. An image reading method used in an image reading device having an image sensor including a plurality of sensor chips therein and being capable of outputting data in parallel through a plurality of output channels, the image reading method comprising:

a method in which either of two outputting modes, one being a parallel outputting mode in which start signals are simultaneously inputted to the plurality of sensor chips so that pieces of data in the plurality of the sensor chips are outputted in parallel through the plurality of output channels, respectively, the other one being an interval outputting mode in which start signals are sequentially inputted to the plurality of sensor chips with intervals of time between any two successive inputs of the start signals, respectively, so that respective pieces of data in the plurality of sensor chips are sequentially outputted through any one of the plurality of output channels, is selected in accordance with a set resolution, wherein the parallel outputting mode is selected in the case where the reading of images is performed at a low-resolution, and the interval outputting mode is selected in the case where the reading of images is performed at a high-resolution, and   wherein the plurality of sensor chips are grouped into a plurality of sensor chip groups, and the selection of outputting mode changes the outputting mode of the sensor chips included in each sensor chip group to the parallel outputting mode or the interval outputting mode.

7. The image reading method of claim 6, wherein in the interval outputting mode for reading of images at the high-resolution, only one piece of image data corresponding to one sensor chip is outputted at a time from the image sensor.

* * * * *